No. 858,042. PATENTED JUNE 25, 1907.
C. J. VAN VALKENBURG.
GATE.
APPLICATION FILED APR. 3, 1907.
2 SHEETS—SHEET 2.
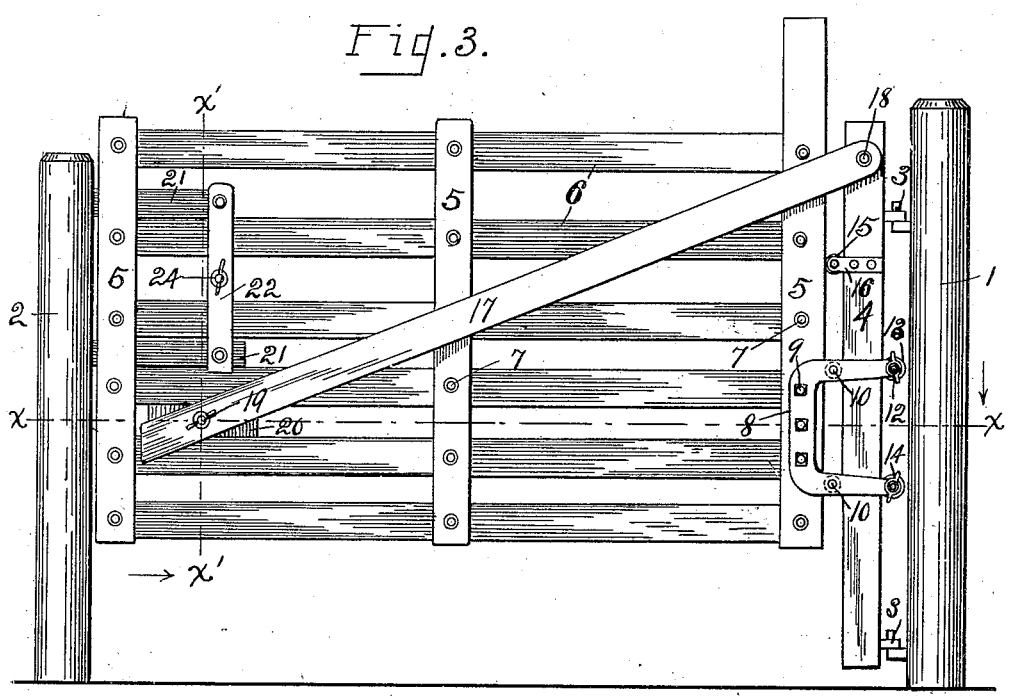
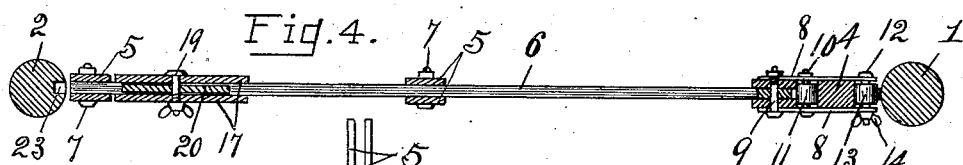
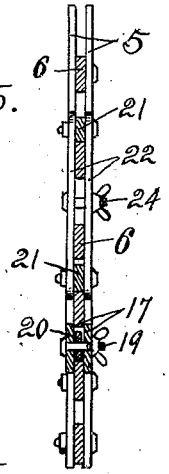
WITNESSES:
D. C. Walter
Hazel B. Hiett
INVENTOR.
C. J. Van Valkenburg,
By Owen & Owen
His attys.

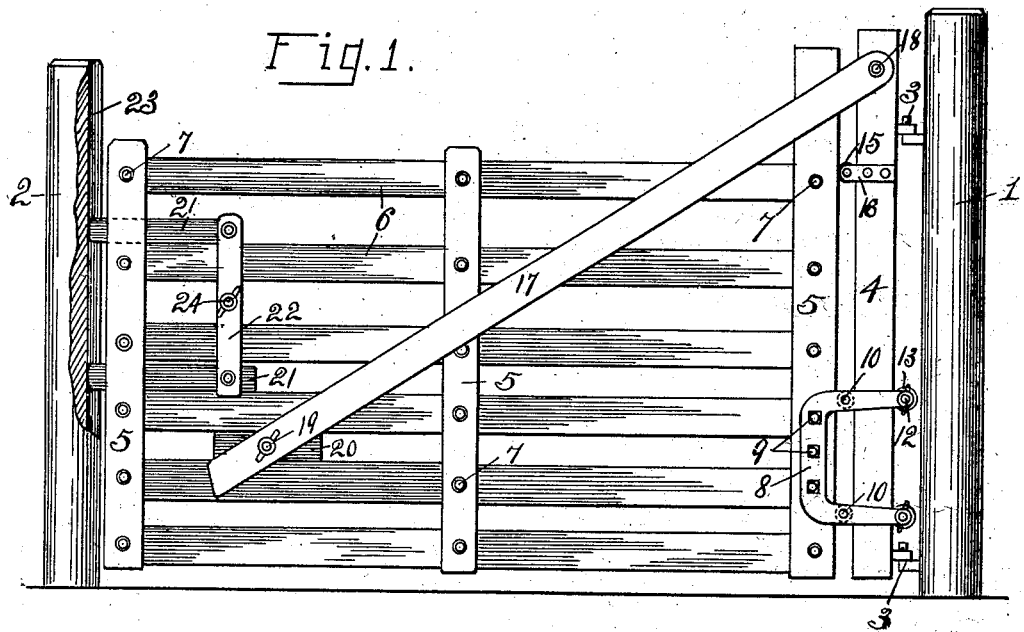

UNITED STATES PATENT OFFICE.

CHARLES J. VAN VALKENBURG, OF MANCHESTER, MICHIGAN.

GATE.

No. 858,042.      Specification of Letters Patent.      Patented June 25, 1907.

Application filed April 3, 1907. Serial No. 366,071.

*To all whom it may concern:*

Be it known that I, CHARLES J. VAN VALKENBURG, a citizen of the United States, and a resident of Manchester, in the county of Washtenaw and State of Michigan, have invented certain new and useful Improvements in Gates; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in gates and refers more particularly to farm or stock gates.

The object of my invention is the provision of a highly efficient gate of this class, which is capable of having either end raised or the whole bodily elevated to adapt it to the surface over which it swings, to escape snowbanks or other obstructions, or to permit the passing of small stock, such as pigs or sheep, thereunder, and which is simple, durable and economical in its construction, thus enhancing its practicability and commercial value.

The operation, construction and arrangement of the parts of the invention are fully described in the following specification and illustrated in the accompanying drawings, in which,—

Figure 1 is a side elevation of a gate embodying the features of my invention with the same in lowered or normal position. Figs. 2 and 3 are similar views thereof, the former showing one end of the gate raised and the latter showing the entire gate elevated in level position, and Figs. 4 and 5 are sections taken, respectively, on the dotted lines x x and x' x' in Fig. 3.

Referring to the drawings, 1 designates the pivot-post and 2 the latch-post between which the gate is hung. Hinged or pivoted, as at 3, to the post 1 is a vertical bar or member 4 by which the gate proper, comprising the two or more sets of opposing vertical slats or stays 5 and the horizontal bars or boards 6, is carried. The bars 6 are secured to the slats or stays 5 by bolts 7, one of which is placed at each point of intersection, thus adapting the bars or slats to have relative pivotal movements and enabling the gate to be tilted from a horizontal without destroying the parallelism of the bars or slats, as shown in Fig. 2. The gate is adjustably secured at its lower portion to the bar 4 by means of the two opposing U-shaped brackets 8, 8, which are bolted as at 9, to opposite sides of the rear set of slats 5 and have their two legs embracing opposite sides of the bar 4, but not bolted thereto. The two brackets 8 are connected intermediate the bars 4 and contiguous gate end by bolts 10, each of which carries an anti-friction roll 11 for coacting with and retaining said bar and gate end in proper relation, as shown. The opposing terminals of the two brackets 8 are connected at the rear of the bar 4 by bolts 12 and each carries an idler-roll 13 for coacting with the rear face of said bar, and a winged nut 14 to facilitate an easy drawing of the opposing legs of the brackets together to frictionally grip the bar 4 whereby to retain the brackets and gate carried thereby in adjusted position relative to the bar 4. To permit a tightening of the bracket-legs relative to the bar the rolls 11 and 13 are made of less width than the coacting faces of the bar, as shown in Fig. 4. Above the brackets 8 is mounted another anti-friction roll 15, which coacts with the gate end and bar 4 in the same manner as the rolls 11, and is carried by opposing arms 16 projecting from the bar 4.

The forward or swinging end of the gate is retained in any position of vertical adjustment relative to its rear end by means of the two opposing diagonal suspending bars or members 17, 17, which have their upper or rear ends pivoted by a common bolt 18 to opposite sides of the upper end portion of the vertical bar 4. The lower or forward ends of the members 17 are pivotally connected by a bolt 19 to a sliding-piece 20, which is mounted for movement between two of the lower bars or boards 6 of the gate, and is of less thickness than said boards to enable the members 17 when drawn together by a turning of the winged nut on said bolt to frictionally grip both of said boards for the purpose of retaining the gate in adjusted position.

21, 21 designate bolt members, which are slidingly mounted between different of the boards 6 and have their rear ends connected by two opposing pieces 22 and their forward ends projecting between the forward set of vertical slats or stays 5 to enable them, when shot, to engage a vertical groove 23 in the inner side of the post 2. The groove 23 is provided instead of separate sockets for the projected ends of the members 21 on account of the vertically adjustable feature of the gate. The bolt members 21 are secured in shot or locked position by the tightening of a bolt 24, which connects the pieces 22 between the crossed boards 6 and causes said pieces to frictionally grip said boards.

It is thus apparent that I have provided a gate which is capable of being easily and quickly knocked down or set up, thus facilitating the packing thereof for shipment to the purchaser, and which is adapted to be bodily elevated or tilted and quickly secured in any desired position of adjustment as the nature or conditions of its use may require.

Having thus described my invention, what I claim as new and desire to secure by Letters Patent, is,—

In combination, a support, a vertical member hinged to said support, a gate comprising longitudinal and transverse bars pivoted at their crossing points, brackets carried at one end of the gate and frictionally coöperating with said member, anti-friction rolls carried by the brackets between the contiguous faces of the gate and said member, means for tightening the brackets relative to the bar, opposing suspensory bars pivoted at one end to opposite sides of the upper end of the vertical member, a piece slidingly mounted between two of the longitudinal bars of the gate adjacent its free end, said piece being of less thickness than said gate bars, and means pivotally connecting the lower ends of the suspensory bars to said piece and adapted to be tightened to cause the lower ends of said suspensory bars to frictionally grip the opposite sides of the contiguous gate bars.

In testimony whereof I have hereunto signed my name to this specification in the presence of two subscribing witnesses.

CHARLES J. VAN VALKENBURG.

Witnesses:
C. W. OWEN,
HAZEL B. HIETT.